(12) United States Patent
Smith et al.

(10) Patent No.: US 9,519,394 B2
(45) Date of Patent: Dec. 13, 2016

(54) METHOD AND APPARATUS FOR CREATING INSTANCES FOR PRE-DEFINED AREAS OF A TOPOLOGY

(71) Applicant: GE Intelligent Platforms, Inc., Charlottesville, VA (US)

(72) Inventors: Steven William Smith, Roanoke, VA (US); Michael Franke, Salem, VA (US); Jack R. Kirby, Jr., Salem, VA (US)

(73) Assignee: GE INTELLIGENT PLATFORMS INC., Charlottesville, VA (US)

( * ) Notice: Subject to any disclaimer, the term of this patent is extended or adjusted under 35 U.S.C. 154(b) by 226 days.

(21) Appl. No.: 13/908,129

(22) Filed: Jun. 3, 2013

(65) Prior Publication Data
US 2014/0359460 A1    Dec. 4, 2014

(51) Int. Cl.
*G06F 3/0482* (2013.01)
*G06F 3/048* (2013.01)
*H04L 12/24* (2006.01)

(52) U.S. Cl.
CPC ............. *G06F 3/048* (2013.01); *G06F 3/0482* (2013.01); *H04L 41/0813* (2013.01); *H04L 41/0886* (2013.01); *H04L 41/22* (2013.01)

(58) Field of Classification Search
CPC ............................ G06F 3/048; G06F 3/0482
USPC ........................................................ 715/736
See application file for complete search history.

(56) References Cited

U.S. PATENT DOCUMENTS

| 9,069,570 B2 * | 6/2015 | Asai ...................... G06F 9/4411 |
| 2001/0003191 A1 | 6/2001 | Kovacs et al. |
| 2004/0024788 A1 * | 2/2004 | Hill ........................ G06Q 10/06 |
| 2005/0243739 A1 * | 11/2005 | Anderson ......... H04L 29/12009 370/254 |
| 2006/0218507 A1 | 9/2006 | K et al. |
| 2007/0075916 A1 * | 4/2007 | Bump .............. G05B 19/41845 345/3.1 |
| 2007/0077665 A1 * | 4/2007 | Bump .............. G05B 19/41845 438/14 |

(Continued)

OTHER PUBLICATIONS

U.S. Appl. No. 13/908,130, filed Jun. 3, 2013, Steven William Smith et al.

(Continued)

*Primary Examiner* — Reza Nabi
*Assistant Examiner* — Daniel Rodriguez
(74) *Attorney, Agent, or Firm* — GE Global Patent Operation

(57) ABSTRACT

Partition information concerning equipment disposed in a local area is determined. The partition information specifies a division of a local area into a plurality of sub-areas with each of the plurality of sub-areas having equipment. The partition information is uploaded to a user and one or more sub-areas are selected. Operational information concerning a plurality of devices contained in the selected sub-area is uploaded relating to the operation or the interconnection of the devices. The uploaded information is presented to the user in a way that facilitates an understanding of a structure of the network. After the information is analyzed, a network modification is selected, and at least one DTM-compliant software instance that implements the network modification is created.

20 Claims, 4 Drawing Sheets

(56) References Cited

U.S. PATENT DOCUMENTS

| | | | | |
|---|---|---|---|---|
| 2007/0078540 A1* | 4/2007 | Bump | ............... | G05B 19/41845 700/90 |
| 2007/0079250 A1* | 4/2007 | Bump | ................ | G05B 23/0216 715/762 |
| 2007/0220131 A1* | 9/2007 | Ozawa | ................ | G05B 19/042 709/223 |
| 2008/0140822 A1* | 6/2008 | Torii | ................... | H04L 41/0213 709/223 |
| 2009/0049207 A1* | 2/2009 | Reynolds | .......... | H04L 12/40013 710/16 |
| 2009/0157925 A1* | 6/2009 | Schwalbe | ............ | G05B 19/409 710/105 |
| 2009/0164989 A1* | 6/2009 | Schwalbe | ............ | G05B 19/042 717/178 |
| 2009/0292524 A1* | 11/2009 | Anne | ................ | G05B 19/0426 703/25 |
| 2009/0292996 A1* | 11/2009 | Anne | ................ | G05B 19/0428 715/736 |
| 2009/0319062 A1* | 12/2009 | Schwalbe | .......... | G05B 19/4185 700/86 |
| 2010/0085599 A1* | 4/2010 | Nomura | ................ | G06F 3/1204 358/1.15 |
| 2013/0131833 A1 | 5/2013 | Wettlin et al. | | |
| 2013/0294285 A1* | 11/2013 | Zhang | ................... | H04W 24/02 370/254 |
| 2014/0108985 A1* | 4/2014 | Scott | ..................... | G06F 3/0484 715/771 |
| 2015/0236920 A1 | 8/2015 | Bevilacqua et al. | | |

OTHER PUBLICATIONS

U.S. Appl. No. 13/908,141, filed Jun. 3, 2013, Steven William Smith et al.

US Non-Final Rejection issued on Aug. 27, 2015 in connection to related U.S. Appl. No. 13/908,130.

US Non-Final Rejection issued Jun. 18, 2015 in connection to related U.S. Appl. No. 13/908,141.

US Final Rejection issued Nov. 5, 2015 in connection to related U.S. Appl. No. 13/908,141.

Non-Final Office Action issued in connection with related U.S. Appl. No. 13/908,141 on Mar. 10, 2016.

\* cited by examiner

METHOD AND APPARATUS FOR CREATING INSTANCES FOR PRE-DEFINED AREAS OF A TOPOLOGY

CROSS REFERENCES TO RELATED APPLICATIONS

Utility application entitled "Method and Apparatus to Present a Control System Topology" naming as inventors Steven Smith, Michael Franke, and Jack Kirby, U.S. patent application Ser. No. 13/908,141;

Utility application entitled "Method and Apparatus for Automatically Creating Instances from a Control System Topology" naming as inventors Steven Smith, Michael Franke, and Jack Kirby, U.S. patent application Ser. No. 13/908,130;

are being filed on the same day as the present application and are incorporated herein by reference in their entireties.

BACKGROUND OF THE INVENTION

Field of the Invention

The present invention generally relates to control systems and, more specifically, to configuring control systems.

Brief Description of the Related Art

Field Device Tool (FDT) applications provide various types of interfaces between devices (e.g., valves, temperature sensors, and pressure sensors) and control systems. To implement the functions in these applications, Device Type Manager (DTM) modules are utilized. For example, a particular user may utilize DTM modules that open and close valves in a manufacturing plant.

DTM modules are typically software modules and used to configure or control the various pieces of equipment. These modules are programmed to send various uniform commands and to keep and display data in a predetermined way. In a typical system, a gateway acts as an intermediate interface between device management applications and actual physical or field devices (e.g., those at a manufacturing plant).

The FDT Frame Application must be configured with the correct DTM types and connections in order to allow communication with the devices and the display of their data. Configuring the FDT Application requires a complete knowledge of the system topology and this, in turn, requires that the field devices be scanned so that the identity of these devices included in the system can be determined.

In previous systems, users are forced to consider much information from the remote site in order to configure the system. This makes things confusing and can lead to errors when configuring the system. All of these problems have led to some user dissatisfaction with these previous approaches.

BRIEF DESCRIPTION OF THE INVENTION

Approaches are provided where users select one or more plant areas or functional areas and automatically create DTM instances for all of the gateway devices hosted by each controller that is part of the selected plant areas and functional groups. This simplifies the process for the user.

In the present approaches, the device manager gateway may have knowledge of the configured system architecture in order to provide a routing service. The device manager gateway provides a communication DTM that enables communication between FDT Frame Applications and the devices in a control system (e.g., the GE ControlST system). The communication DTM implements an interface that allows it to upload the configured system topology from the device manager gateway, rather than issuing scan requests to the physical devices in the system as the mechanism for auto discovery of the system topology as is normally done in the FDT environment. The device manager gateway may provide both the list of controllers in the system as well as the names of the configured plant areas and functional groups defined in the system to the FDT communication DTM. The communication DTM user interface allows the user to select one or more plant areas or functional areas and automatically creates gateway DTM instances for all of the gateway devices hosted by each controller that is part of the selected plant areas and functional groups.

In many of these embodiments, partition information concerning equipment disposed in a local area is determined. The partition information specifies a division of a local area into a plurality of sub-areas with each of the plurality of sub-areas having equipment. The partition information is uploaded to a user. One of the sub-areas is selected. Operational information concerning a plurality of devices contained in the selected sub-area is uploaded and the operational information relates to one or more of an operation of the devices or the interconnection of the plurality of devices. The uploaded operational information is graphically presented on a visual presentation medium to the user in a way that facilitates an understanding of a structure of the network and the presented information on the visual presentation medium is analyzed. Based upon the analyzing, a network modification is selected via an interaction with the visual presentation medium. The interaction is effective to automatically create at least one DTM-compliant software instance that implements the network modification.

In some aspects, the partition information is based upon a geographic location or a functionality. In other aspects, the predefined local area comprises a manufacturing plant or a utility plant. In some examples, the equipment comprises valves or sensors.

In other aspects, the visual presentation medium comprises a graphical display unit. In some examples, the graphical display unit is disposed on a device such as a personal computer, a lap top, a cellular phone and a personal digital assistant. Other examples of devices are possible. In other aspects, the uploading of the various information is performed by a gateway.

In others of these embodiments, an apparatus that is configured to add DTM-compliant instances to a FDT framework application includes a device manager gateway and a communication DTM. The communication DTM is configured to receive partition information concerning equipment disposed in a local area. The partition information specifies a division of a local area into a plurality of sub-areas and each of the plurality of sub-areas has equipment.

The device manager gateway is coupled to the communication DTM and is configured to upload the partition information to the communication DTM and present the partition information to a user on a visual presentation medium. The communication DTM is further configured to receive a first selection of one of the sub-areas from the user and to upload operational information concerning a plurality of devices contained in the selected sub-area based upon the first selection. The operational information relates to one or more of an operation of the devices or the interconnection of the plurality of devices. The communication DTM is configured to graphically present the uploaded operational information on the visual presentation medium to the user in a way that facilitates an understanding of a structure of the network. The communication DTM is configured to receive a second selection from the user. The second selection is a network modification. The communication DTM is further configured to automatically create at least one DTM-compliant software instance that implements the network modification.

Figure 1A:
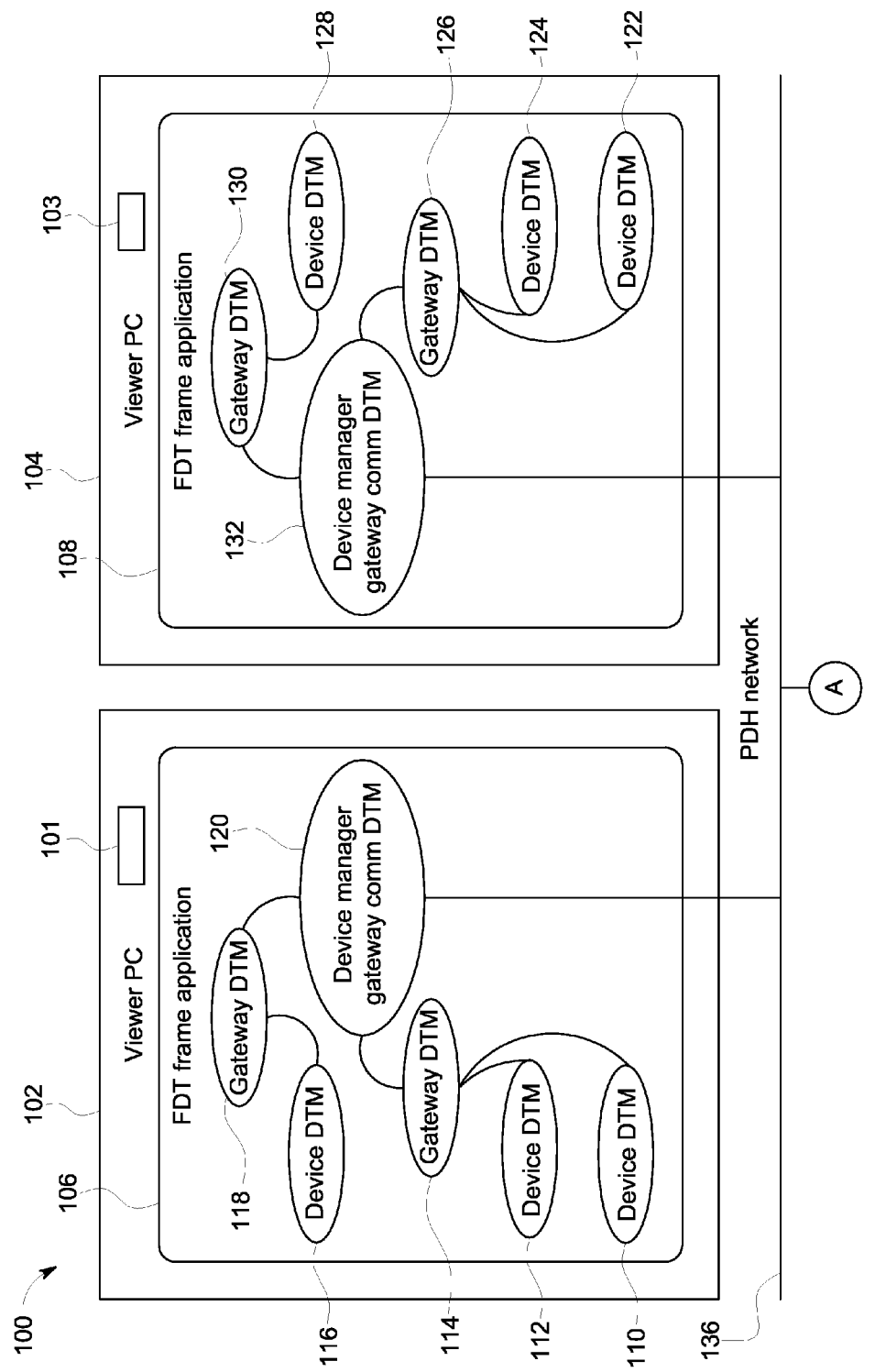
FIGS. 1A and 1B, having common connection point "A", together comprise a block diagram of a system for adding DTM instances in a FDT frame application according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the approaches described herein, users select one or more plant areas or functional areas and automatically create DTM instances for all of the gateway devices hosted by each controller that is part of the selected plant areas and functional groups. This simplifies the configuration process for the user.

In some aspects, the system is partitioned into various or multiple FDT projects or areas, each with a small number of devices. Partitioning the system from the FDT frame application perspective is typically a manual exercise that requires knowledge of the system topology by the user. In the present approaches, the device manager gateway and its associated communication DTM allows this partitioning to be done in any control system configuration, where the system topology is known and the configuration is done by a system expert. The device manager gateway provides both the list of individual controllers and the configured controller groupings to the communication DTM. The FDT frame application user is able to select individual controllers or predefined groups of controllers, greatly simplifying the partitioning effort.

The FDT frame application user is typically an expert on remotely located devices (e.g., General Electric Fieldbus Devices) and using the FDT Frame Application. However, such users are typically not experts on the actual control system and its topology. In the present approaches, the communication DTM reflects the configured control system partitioning and allows a user with little or no knowledge of the control system topology to leverage this system configuration in order to minimize FDT Frame Application performance issues in large systems.

Making the configured control system partitioning information available to the user in a device manager gateway communication DTM reduces the level of system knowledge and manual configuration required to partition a large system in the FDT Frame Application. The result is a significant reduction in the time and expense required to configure and partition a large system in the FDT Frame application and allows the partitioning to be done by a user with minimal knowledge of the system topology. Reflecting the configured control system partitioning in the device manager gateway communication DTM also promotes consistency between the topology represented in the control system configuration tools and the FDT Frame Application projects.

Figure 1B:
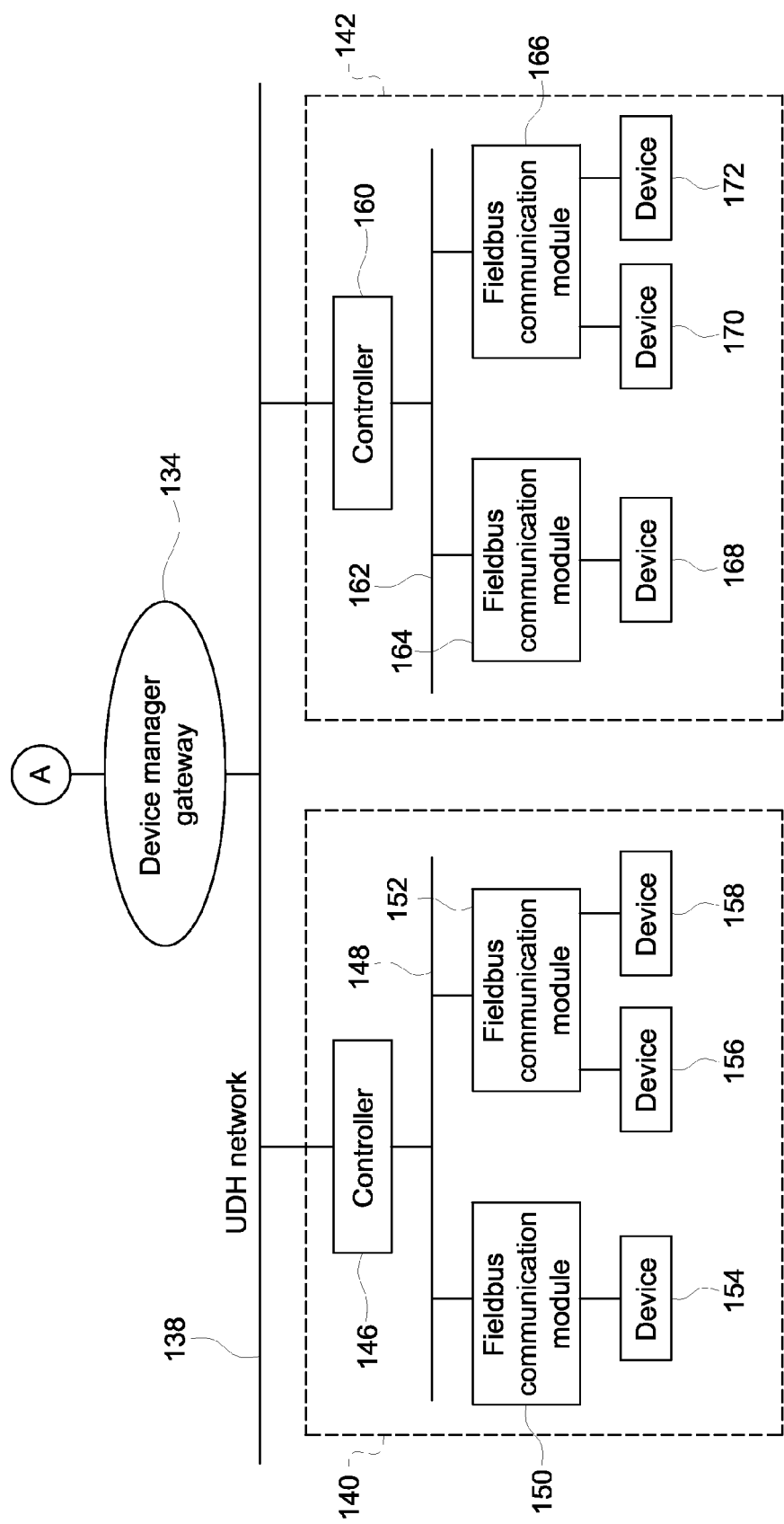

Referring now to FIGS. 1A and 1B, one example of a system 100 that is configured to provide a control system topology to a communication DTM (or some other entity) is described. The system 100 includes a first viewer personal computer 102 and a second viewer personal computer 104. The first viewer personal computer 102 and the second viewer personal computer 104 are any type of user interface device such as a personal computer, laptop, cellular phone, personal digital assistant, or any other device having a processor, memory and that is capable of displaying information in any format to a user.

It will be appreciated that the modules and functions described herein can be implemented as programmed software operating on a general purpose programming device such as a microprocessor. However, any combination of computer hardware and/or programmed computer software may be utilized to implement these functions and modules.

The first viewer personal computer 102 includes a first FDT frame application 106. The first FDT frame application 106 includes a first gateway DTM 118, a second gateway DTM 114, a first device manager gateway communication DTM 120, a first device DTM module 116, a second device DTM module 112, and a third device DTM module 110. The second viewer personal computer 104 includes a second FDT frame application 108. The second FDT frame application 108 includes a third gateway DTM module 130, a fourth gateway DTM module 126, a second device manager gateway communication DTM 132, a fourth device DTM module 128, a fifth device DTM module 124 and a sixth device DTM module 122.

A plant data highway (PDH) network 136 couples to a device manager gateway 134 (shown in FIG. 1B). The device manager gateway 134 couples to a first local network 140 and a second local network 142 via a unit data highway (UDH) network 138. The plant data highway (PDH) network 136 and unit data highway (UDH) network 138 operate according to established protocols as known to those skilled in the art and these will not be discussed further herein. Other examples and types of networks may also be used.

The first local network 140 includes a first controller 146 that is coupled to a first field bus communication module 150 and a second field bus communication module 152 via a local network 148. A first device 154 couples to the first field bus communication module 150. A second device 156 and a third device 158 couples to the second field bus communication module 152.

The second local network 142 includes a second controller 160 that is coupled to a third field bus communication module 164 and a fourth field bus communication module 166 via a local network 142. A fourth device 168 couples to the third field bus communication module 164. A fifth device 170 and a sixth device 172 couples to the fourth field bus communication module 166.

The DTM modules 110, 112, 116, 122, 124, and 128 are software modules that know how to contact a particular piece of equipment 154, 156, 158, 168, 170, or 172. The modules 110, 112, 116, 122, 124, and 128 know the device's parameters and automatically include functionality to create messages to obtain or change information that are specific to a particular piece of equipment.

The Gateway DTM 114 and the gateway DTM are 118 are I/O modules that communicate with the DTM equipment module in its native format and forward the messages/communications between the equipment modules and the Device manager gateway communication module 120 or 132.

The Device manager gateway communication DTM 120 and 132 make connections and exchange communications with the Device gateway manager at a remote location, e.g., a plant.

The first viewer personal computer 102 or the second viewer personal computer 104 shows the information in an appropriate format. This may be located at a personal computer to take one example.

The Device gateway manager 134 is located at a remote location, e.g., a plant. It knows the routing of messages to and from the particular pieces of equipment and which DTM to send the message to if received from the equipment. The controllers 146 and 160 pass messages to the field bus communications modules 150, 152, 164, and 166 and may be implemented as processors executing programmed computer software.

The field bus communication module 150, 152, 164, and 166 provides input/output (i/o) functions (e.g., transmitting and receiving information) with respect to the equipment or devices 154, 156, 158, 168, 170, and 172. The equipment 154, 156, 158, 168, 170, and 172 may be valves or sensors to mention two examples. Other examples of equipment may also be used.

In one example of the operation of the system of FIGS. 1A and 1B, partition information concerning equipment disposed in a local area is determined. The partition information specifies a division of a local area into a plurality of sub-areas with each of the plurality of sub-areas having equipment. The partition information is uploaded to a user via the device manager gateway 134 and device manager gateway communication DTMs 120 or 132. One of the sub-areas is selected, for example, using the visual presentation medium (e.g., screens) 101 or 103.

Operational information concerning a plurality of devices contained in the selected sub-area is uploaded via the device manager gateway 134 and device manager gateway communication DTMs 120 or 132 and the operational information relates to one or more of an operation of the devices 154, 156, 158, 168, 170, and 172 or the interconnection of the plurality of devices 154, 156, 158, 168, 170, and 172. The uploaded operational information is graphically presented on a visual presentation medium 101 or 103 to the user in a way that facilitates an understanding of a structure of the network and the presented information on the visual presentation medium 101 or 103 is analyzed. Based upon the analyzing, a network modification is selected via an interaction with the visual presentation medium 101 or 103, for example by the user. The interaction is effective to automatically create at least one DTM-compliant software instance that implements the network modification.

Figure 2:
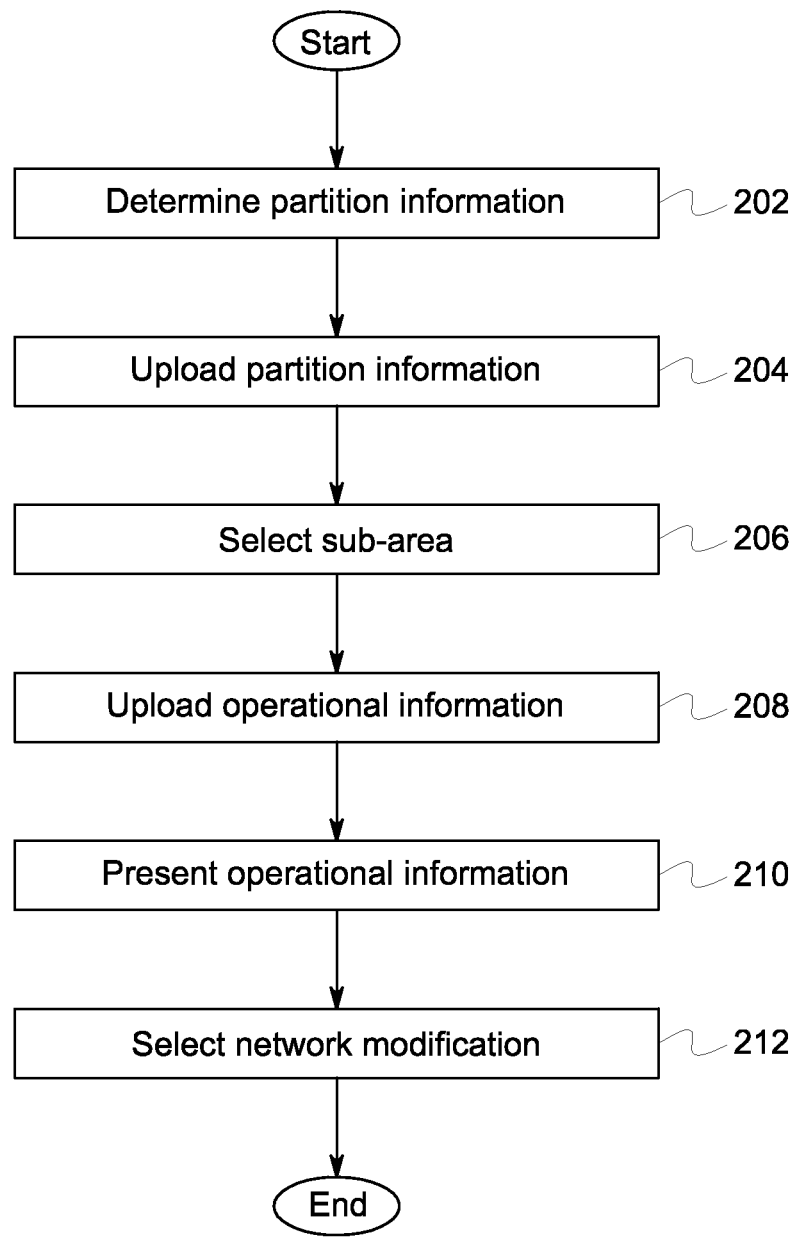
FIG. 2 comprises a flow chart of an approach for adding DTM instances in a FDT frame application according to various embodiments of the present invention.

Referring now to FIG. 2, one example of an approach for creating DTM instances is described. At step 202, partition information concerning equipment disposed in a local area is determined. The partition information specifies a division of a local area into a plurality of sub-areas with each of the plurality of sub-areas having equipment. At step 204, the partition information is uploaded to a user.

At step 206, one of the sub-areas is selected by the user. At step 208, operational information concerning a plurality of devices contained in the selected sub-area is uploaded and the operational information relates to one or more of an operation of the devices or the interconnection of the plurality of devices. At step 210, the uploaded operational information is graphically presented on a visual presentation medium to the user in a way that facilitates an understanding of a structure of the network and the presented information on the visual presentation medium is analyzed.

At step 212 and based upon the analyzing, a network modification is selected via an interaction with the visual presentation medium. The interaction is effective to automatically create at least one DTM-compliant software instance that implements the network modification. Appropriate FDT processes are used to create the DTM-compliant software instances.

Figure 3:
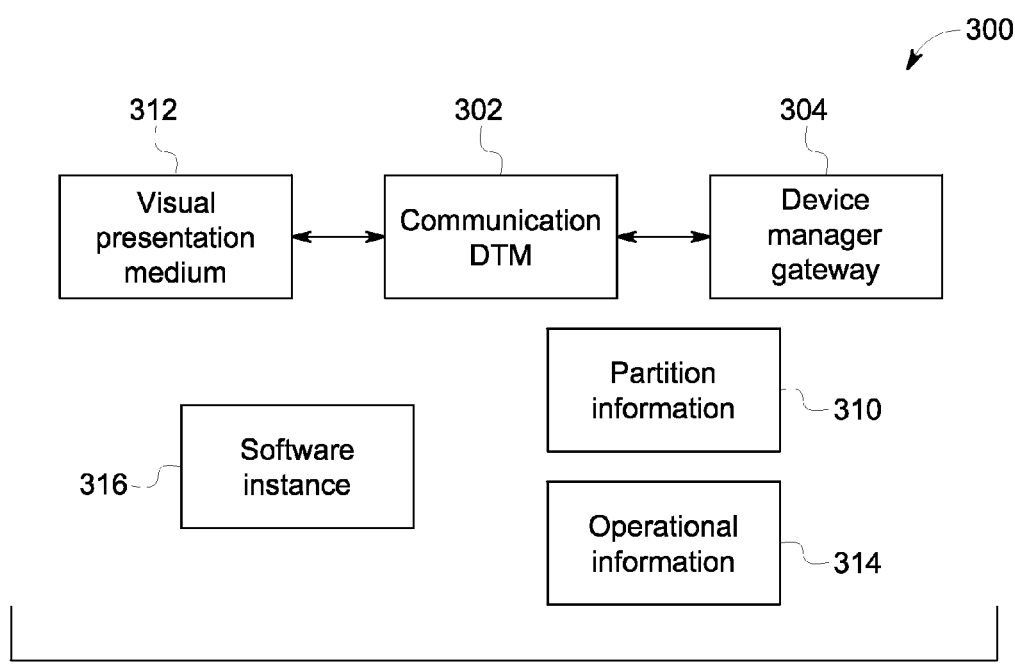
FIG. 3 comprises a block diagram of an apparatus for adding DTM instances in a FDT frame application according to various embodiments of the present invention.

Referring now to FIG. 3, one example of an apparatus 300 that is configured to add DTM-compliant instances to a FDT framework application is described. The apparatus 300 includes an a device manager gateway 304 and a communication DTM 302. The input of the communication DTM 302 is configured to receive partition information 310 concerning equipment disposed in a local area. The partition information 310 specifies a division of a local area into a plurality of sub-areas and each of the plurality of sub-areas has equipment.

The device manager gateway 304 is coupled to the communication DTM 302 and is configured to upload the partition information 310 and present the partition information 310 to a user on a visual presentation medium 312. The communication DTM 302 is further configured to receive a first selection of one of the sub-areas from the user and to upload operational information 314 concerning a plurality of devices contained in the selected sub-area based upon the first selection. The operational information 314 relates to one or more of an operation of the devices or the interconnection of the plurality of devices. The communication DTM 302 is configured to graphically present the uploaded operational information on the visual presentation medium 312 to the user in a way that facilitates an understanding of a structure of the network.

The communication DTM 302 is configured to receive a second selection from the user. The second selection is a network modification. The communication DTM 302 is further configured to automatically create at least one DTM-compliant software instance 316 that implements the network modification. Appropriate FDT processes are used to create the DTM-compliant software instances.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, comprising:
   obtaining, by a communication device type manager (DTM) of an apparatus comprising a processor via a network, partition information from a device manager gateway device disposed in a local area, wherein the partition information specifying a division of the local area into a plurality of sub-areas, and each sub-area comprises a plurality of devices connected in at least one Field Device Tool (FDT)-compliant network;

displaying, by the apparatus on a visual presentation medium, a first graphical presentation based on the partition information, wherein the first graphical presentation provides a depiction of the sub-areas;

receiving, by the apparatus, a first input indicating first user selection of a sub-area of the sub-areas;

in response to the first input, obtaining, by the communication device type manager (DTM) of the apparatus via the network, configured system topology information from the device manager gateway device concerning the plurality of devices contained in the selected sub-area, wherein the configured system topology information relates at least one of an operation of the plurality of devices or an interconnection of the plurality of devices;

displaying, by the apparatus on the visual presentation medium, a second graphical presentation based on the configured system topology information;

receiving, by the apparatus, a second input indicating second user selection of a modification associated with the selected sub-area; and in response to the second input, creating, by the apparatus based upon an analysis of the configured system topology information, a DTM-compliant software instance for each device of the plurality of devices in the selected sub-area.

2. The method of claim 1, wherein the partition information is based upon a geographic location or a functionality.

3. The method of claim 1, wherein the local area comprises a manufacturing plant or a utility plant.

4. The method of claim 1, wherein the plurality of devices comprises at least one of valves or sensors.

5. The method of claim 1, wherein the visual presentation medium comprises a graphical display unit.

6. The method of claim 5, wherein the graphical display unit is disposed on one of a personal computer, a lap top, a cellular phone, or a personal digital assistant.

7. An apparatus comprising:
a processor; and
a memory communicatively coupled to the processor, the memory having stored therein computer-executable instructions, comprising:
a communication device type manager (DTM) component configured to:
receive partition information from device manager gateway device via a network, wherein the partition information specifying a division of a local area into a plurality of sub-areas, and each sub-area comprises a plurality of devices connected in at least one Field Device Tool (FDT)-compliant network,
display, on a visual presentation medium, a first graphical presentation based on the partition information, wherein the first graphical presentation provides a list of the sub-areas,
receive a first input indicating a first user selection of a sub-area of the sub-areas,
in response to the first input, obtain, via the network, configured system topology information from the device manger gateway device concerning the plurality of devices contained in the selected sub-area, wherein the configured system topology information relates to at least one of an operation of the plurality of devices or an interconnection of the plurality of devices,
display, on the visual presentation medium, a second graphical presentation based on the configured system topology information,
receive a second input indicating a second user selection of a modification associated with the selected sub-area,
in response to the second input and based upon an analysis of the configured system topology information, create, based upon an analysis of the configured system topology information, a DTM-compliant software instance for each device of the plurality of devices in the selected sub-area.

8. The apparatus of claim 7, wherein the partition information is based upon a geographic location or a functionality.

9. The apparatus of claim 7, wherein the local area comprises a manufacturing plant or a utility plant.

10. The apparatus of claim 7, wherein the plurality of devices comprises at least one of valves or sensors.

11. The apparatus of claim 7, wherein the visual presentation medium comprises a graphical display unit.

12. The apparatus of claim 11, wherein the graphical display unit is disposed on a device selected from the group comprising a personal computer, a lap top, a cellular phone and a personal digital assistant.

13. The apparatus of claim 7, wherein each sub-area is associated with a controller hosting the plurality of devices of the sub-area, and the second user selection of the modification comprises selection of the controller associated with the selected sub-area.

14. The method of claim 1, wherein each sub-area is associated with a controller hosting the plurality of devices of the sub-area, and the second user selection of the modification comprises selection of the controller associated with the selected sub-area.

15. A non-transitory computer-readable medium having instructions stored thereon that, in response to execution, cause an apparatus including a processor to perform operations comprising:
obtaining, by a communication device type manager (DTM) via a network, partition information from a device manager gateway device disposed in a local area, wherein the partition information specifying a division of the local area into a plurality of sub-areas, and each sub-area comprises a plurality of devices connected in at least one Field Device Tool (FDT)-compliant network;
displaying, on a visual presentation medium, a first graphical presentation based on the partition information, wherein the first graphical presentation provides a depiction of the sub-areas;
receiving a first input indicating first user selection of a sub-area of the sub-areas;
in response to the first input, obtaining, by the communication device type manager (DTM) via the network, configured system topology information from the device manager gateway device concerning the plurality of devices contained in the selected sub-area, wherein the configured system topology information relates to at least one of an operation of the plurality of devices or an interconnection of the plurality of devices;
displaying, by the apparatus on the visual presentation medium, a second graphical presentation based on the configured system topology information;
receiving, by the apparatus, a second input indicating second user selection of a modification associated with the selected sub-area; and
in response to the second input and based upon an analysis of the configured system topology information, creating a DTM-compliant software instance for each device of the plurality of devices in the selected sub-area.

16. The non-transitory computer-readable medium of claim 15, wherein the partition information is based upon a geographic location or a functionality.

17. The non-transitory computer-readable medium of claim 15, wherein the local area comprises a manufacturing plant or a utility plant.

18. The non-transitory computer-readable medium of claim 15, wherein the plurality of devices comprises at least one of valves or sensors.

19. The non-transitory computer-readable medium of claim 15, wherein the visual presentation medium is
   selected from the group comprising a personal computer, a lap top, a cellular phone, and a personal digital assistant.

20. The non-transitory computer-readable medium of claim 15, wherein each sub-area is associated with a controller hosting the plurality of devices of the sub-area, and the second user selection of the modification comprises selection of the controller associated with the selected sub-area.

\* \* \* \* \*